Dec. 24, 1940. H. WALL 2,226,291

HEAT EXCHANGER

Filed July 28, 1939

Inventor:
Horace Wall,
by Harry E. Dunham
His Attorney.

Patented Dec. 24, 1940

2,226,291

UNITED STATES PATENT OFFICE 2,226,291

HEAT EXCHANGER

Horace Wall, Schenectady, N. Y., assignor to General Electric Company, a corporation of New York Application July 28, 1939, Serial No. 287,059

4 Claims. (Cl. 257—263)

My invention relates to heat exchangers and more particularly to fins for use in heat exchangers.

Objects and advantages of my invention will become apparent as the following description proceeds and the features of novelty which characterize my invention will be pointed out with particularity in the claims annexed to and forming a part of this specification.

Figure 1:
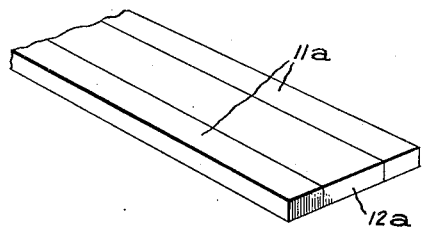
Figure 2:
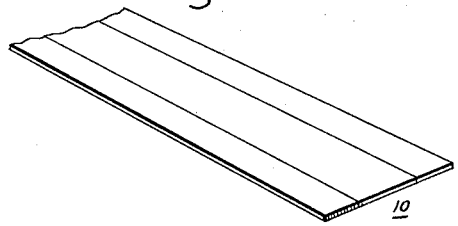
Figure 3:
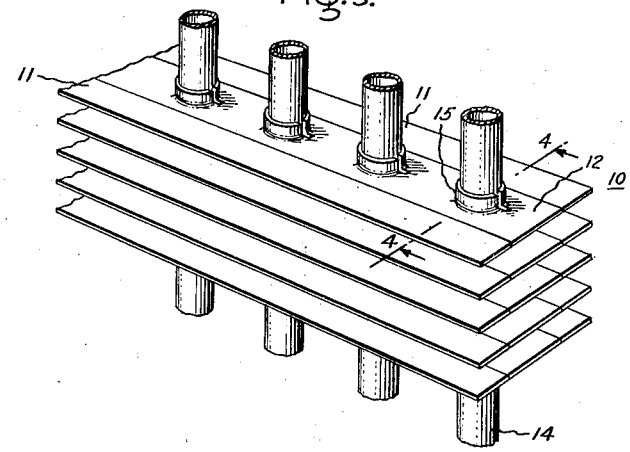
Figure 4:
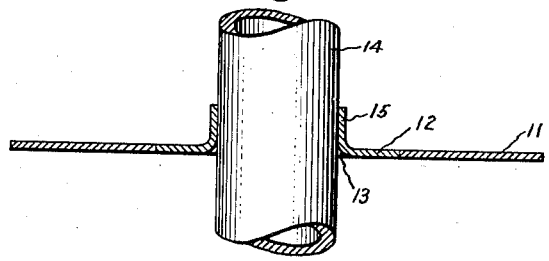

For a better understanding of my invention reference may be had to the accompanying drawing in which Figs. 1 and 2 are perspective views illustrating steps in the formation of fins embodying the principles of my invention; Fig. 3 is a perspective view of a heat exchanger employing the fins formed in accordance with my invention; and Fig. 4 is an enlarged sectional view taken along the line 4—4 of Fig. 3.

Under certain conditions it may be desirable to employ a fin comprising a heat-transmitting portion of one heat-conducting material and a securing portion of a different heat-conducting material for joining the heat transmitting portion to the body to which or from which heat is to be transferred. For example, copper is commonly used in heat exchangers but copper is unsatisfactory in cooling coils exposed to vinegar fumes. On the other hand, aluminum is relatively satisfactory for this purpose but has not been heretofore employed because of the difficulty encountered in soldering the aluminum to the copper fluid conveying tubes provided for the cooling fluid.

In the form of my invention illustrated in Fig. 3, I have provided a fin 10 comprising principal heat transferring portions 11 of suitable material such as aluminum integral with a securing portion 12 of a different material, such as copper for example, provided with openings 13 through which fluid conveying conduits 14 are passed. The material adjacent the openings 13 in portion 12 may be struck up to form a collar 15 to facilitate fastening portion 12 to the tube 14 in intimate thermal engagement therewith.

In the manufacture of the fins disclosed herein, blocks 11a of suitable size and shape are first secured to a central core 12a as illustrated in Fig. 1. Assuming that the blocks 11a are of aluminum and the block 12a is of copper, the blocks may be welded as by the procedure described and claimed in U. S. Letters Patent 2,114,837, granted April 19, 1938, to Robert T. Gillette. In accordance with this procedure, the ends of the parts to be welded are brought together with sufficient pressure to prevent arcing and spattering of metal at the joint between them when a welding current is passed through the joint, the ends of the parts are then brought to a welding temperature by passing welding current through them while maintaining this pressure, and the weld is completed by simultaneously interrupting the flow of welding current and pushing the parts together to force from between them all but a very thin layer of the copper-aluminum alloy formed during the welding operation. During the formation of the welds a part of each metallic section is forced out of the weld forming an enlargement or "flash" which contains the brittle alloys of copper and aluminum. This "flash" is removed by cutting or grinding, for example. The composite block is then rolled down to a fin strip as illustrated in Fig. 2. The next step is to punch openings 13 in the central copper portion of the fin 10, the collars 15 preferably being punched out in the same operation. A plurality of fins 10 may then be stacked on tubes 14 in suitable spaced-apart relationship and secured to the tubes 14 as by soldering. This method avoids the necessity for soldering aluminum fins to copper tubes, successful methods for which have not been developed.

While I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States is:

1. In a heat exchanger, a fin formed from aluminum and having a securing portion welded thereto and formed of a different readily solderable heat conducting material, said securing portion being adapted to be soldered to a body to or from which heat is to be transferred.

2. In a heat exchanger, an aluminum fin and a copper securing portion welded thereto, the weld including a thin layer of copper-aluminum alloy formed during the welding operation.

3. In a heat exchanger, an aluminum fin having a securing portion welded thereto, said securing portion being provided with an opening for the insertion of a fluid conveying conduit, said securing portion and said conduit being formed from materials which may be readily joined in intimate heat exchange relationship.

4. In a heat exchanger, an aluminum fin having a copper securing portion welded thereto, said copper portion being provided with an opening therethrough, a fluid conveying conduit formed of copper passing through said opening, the material adjacent said opening being formed into a collar engaging said tube for securing said tube to said fin.

HORACE WALL.